United States Patent
Criggall et al.

(12)
(10) Patent No.: US 6,338,866 B1
(45) Date of Patent: Jan. 15, 2002

(54) PET FOODS USING ALGAL OR FUNGAL WASTE CONTAINING FATTY ACIDS

(75) Inventors: James G. Criggall, Winchester, KY (US); Nayankumar B. Trivedi; James R. Hutton, both of O'Fallon, MO (US)

(73) Assignee: Applied Food Biotechnology, Inc., O'Fallon, MD (US)

( * ) Notice: Subject to any disclaimer, the term of this patent is extended or adjusted under 35 U.S.C. 154(b) by 0 days.

(21) Appl. No.: 09/504,258

(22) Filed: Feb. 15, 2000

(51) Int. Cl.⁷ .................................................. A21D 2/00
(52) U.S. Cl. ........................... 426/549; 426/53; 426/62; 426/553; 426/653; 426/805
(58) Field of Search ............................ 426/549, 53, 62, 426/553, 805, 653

(56) References Cited

U.S. PATENT DOCUMENTS

| | | | | |
|---|---|---|---|---|
| 4,526,791 A | * | 7/1985 | Young | 426/53 |
| 5,656,319 A | * | 8/1997 | Barclay | 426/574 |
| 5,698,244 A | * | 12/1997 | Barclay | 426/2 |
| 6,255,505 B1 | * | 7/2001 | Bijl et al. | 554/227 |

FOREIGN PATENT DOCUMENTS

| | | | | |
|---|---|---|---|---|
| DE | 262872 | * | 1/1988 | |
| DE | 259998 | * | 9/1988 | |
| DE | 264143 | * | 1/1989 | |
| DE | 273575 | * | 11/1989 | |
| EP | 452689 | * | 10/1991 | |
| SU | 1677060 | * | 9/1991 | |
| WO | 9638536 | * | 12/1996 | |

\* cited by examiner

Primary Examiner—Chhaya D. Sayala
(74) Attorney, Agent, or Firm—Patrick D. Kelly

(57) ABSTRACT

Methods are disclosed for using a waste product which remains when various types of algae (such as *Crypthecodinium cohnii*) or non-yeast fungi (such as *Mortierella alpina*) are used to manufacture essential fatty acids. This waste product is a biomass which includes the cell carcasses that remain after one or more essential fatty acids (such as docosahexaenoic acid, DHA) have been extracted from lysed (ruptured) cells. In one preferred embodiment which forms a biscuit-type treat for dogs or cats, algal biomass is mixed with a combination of brewer's yeast, a grain product such as whole wheat, and burnt residues that collect on the interior walls of drying vessels used for spray-drying of yeast extracts. These ingredients are mixed with water to form a dough-like substance, which is made into a desired shape for a dog, cat, or other pet treat. The dough is then cooked to form a pleasant-smelling biscuit-type treat which dogs and cats find highly appealing. In another embodiment, algal biomass is incorporated into "flavor or palatability enhancer" (FPE) additives that are coated onto the surfaces of pelleted or extruded chunks (kibbles), to prepare a flavored dog or cat food. Using algal or fungal biomass in this manner eliminates a noxious and foul-smelling waste problem for manufacturers of nutrition supplements. In addition, pet foods created in this manner contain significant quantities of DHA, a nutrient that is highly valuable in foods for dogs and cats.

16 Claims, No Drawings

PET FOODS USING ALGAL OR FUNGAL WASTE CONTAINING FATTY ACIDS

BACKGROUND OF THE INVENTION

This invention is in the field of pet foods and pet food flavor enhancers.

This invention relates to foods for mammalian companion animals, including cats, dogs, ferrets, and pot-bellied pigs. Although it may also be useful for livestock, poultry, or other farm animals, or for aquaculture, those options have not yet been evaluated, and this invention does not cover, claim, or relate to such uses.

A well-known class of biological compounds called "essential fatty acids" are comparable to vitamins in two important respects: (1) they are necessary for the health of humans and other mammals; but, (2) mammals cannot synthesize these compounds within their own bodies. Therefore, mammals must ingest essential fatty acids in foods or nutritional supplements. Certain types of fish (especially fish with dark flesh, such as salmon and tuna) are especially good sources of essential fatty acids.

Such fish, in turn, usually obtain their supplies of essential fatty acids from marine algae. Based on that knowledge, several companies that make nutritional supplements for human use or for pet foods have isolated marine algae which synthesize one or more essential fatty acids. Those companies manufacture fatty acids by fermenting such algae (including a species known as *Crypthecodinium cohnii*) under controlled conditions. After the fermentation process is complete, the algal cells are lysed (i.e., ruptured and broken apart) by chemical or physical means, and the fatty acids are extracted from the biomass, using chemical solvents.

If the final product is intended for human ingestion, a series of complex purification steps must be used to ensure that the final product meets the purity and safety requirements for human foods or drugs. If the product is intended for pets, the purification steps are less complex.

Pet owners and pet food manufacturers are especially interested in a specific fatty acid called docosahexaenoic acid (abbreviated as DHA). This compound has 22 carbon atoms (implied by the prefix "docosa-") with 6 unsaturated bonds (as implied by the name "hexa-enoic"). It is an "omega-3" fatty acid, with a carboxylic acid group at one end (designated as the #22 carbon atom) and an unsaturated bond between the #3 and #4 carbon atoms.

DHA is a valuable additive in pet foods, since it helps promote a lustrous, healthy-looking coat in dogs and cats. Other fatty acids which are useful in pet nutrition and which are synthesized by known strains of algae or fungus include gamma-linolenic acid and arachidonic acid.

In addition to use for mammalian pets, various companies also use algae to manufacture esssential fatty acids for use in poultry feeds, and in aquaculture (i.e., farm-raised fish). Typically, preparations containing entire algae cells (usually killed and often lysed, but with no further purification or other processing) are fed to such poultry and fish.

As noted above, one species of marine algae used in commercial manufacturing of DHA for dogs or cats is *Crypthecodinium cohnii*. Several other microbes (including a fungus called Mortierella alpina) are also believed to generate DHA and/or other essential fatty acids useful in animal nutrition; the Mortierella is also believed to generate a biomass (after the fatty acids have been extracted) which has a noxious odor, and which must be disposed of in a manner comparable to the algal wastes described above.

In addition, certain types of seaweeds and "macroalgae" which produce carrageenan (a sulfated polysaccharide used as a gelling and emulsifying agent) also generate DHA. Such sources are believed to include Rhodophyceae, *Gigartinaceae, Gigartina stellata,* and *Chondrus crispus.*

All references herein to "fungus" or "fungi" are limited to non-yeast fungi. Yeast (a subclass of fungus, in the family Saccharomycetaceae) are widely used in foods, and many types of yeast do not have any noxious odors, and are entirely suitable for food preparations. This invention does not relate to yeast; instead, it relates to a new method of using biomass waste material which currently is being discarded as an unwanted solid waste material. This waste material is generated by marine algae and non-yeast fungi which synthesize essential fatty acids, but which also generate noxious odors that have interfered with productive use of any residual biomass that remains after the fatty acids are extracted.

The use of algae or non-yeast fungi to manufacture essential fatty acids for human ingestion, or to manufacture DHA for dog or cat foods, creates large quantities of biomass residue. This residue contains the remains of algae or fungal cells (such remains are referred to herein as "cell carcasses") that have been killed and then broken apart and chemically treated to extract as much of their fatty acids as economically practical. The cellular residues which remain after the fatty acids have been extracted from marine algae cells must be treated as a noxious and potentially hazardous waste product, for two reasons: (i) it has a pungent, foul, and noxious smell, resembling fish or seaweed that has passed its prime and has begun to rot; and, (ii) since it is a biological waste product, it can support further microbial degradation by a wide variety of other microbes, including potentially pathogenic microbes.

For both of these reasons, under the current and prior art practices, the cellular waste products generated during microbial synthesis of fatty acids must be disposed of properly, using sanitary landfills, incineration, or similar means.

Despite its pungent and noxious odor, efforts have been made in the past to use this type of algal waste product as an additive in animal feeds. This was especially true when the algae were used to manufacture DHA that was intended for dog or cat foods, since it is well-known that DHA is a costly and premium additive in dog and cat foods. In general, people engaged in such efforts hoped that if the semi-rotting fishy odor could be diluted, and properly blended with other ingredients, it might be palatable and perhaps even appealing to dogs and cats, and might offer an inexpensive source of nutritional DHA or other fatty acids.

However, to the best of the inventors' knowledge and belief, none of those prior efforts ever succeeded. Prior to this invention, no one managed to find a satisfactory way to use residual DHA-containing algal biomass waste products (or waste products from manufacturing operations that use Mortierella fungi) in a manner that would satisfy the desires, not just of companion animals such as dogs or cats, but of their owners as well.

It should be emphasized that satisfying the aroma preferences of humans is essential to any successful pet food. Pet owners simply will not buy a pet food that smells foul and noxious to them, regardless of whether their pets might like it.

Accordingly, prior to the current invention, no one ever managed to create a satisfactory pet food or pet food flavoring which contains biomass waste products containing the cell carcasses of marine algae or other microbes used to manufacture fatty acids.

Those prior failures have now been overcome, largely through a serendipitous discovery that involved broken bags of brewer's yeast. The bags containing the brewer's yeast ruptured during shipping, rendering the yeast unfit for its intended use. This problem left the recipient of that shipment with yet another solid waste problem, which had to be handled somehow.

Using his trained judgment developed through decades of working with animal feeds, that coinventor began experimenting with combinations of algal waste mixed with brewer's yeast, "off-spec" (i.e., burned) residues generated during the heating and drying step used to create yeast extract, and various other ingredients. Those experiments resulted in a molded and baked biscuit-type dog food product. That type of product is called a "pet treat" herein.

In general, pet "treats" include food items which are designed to be handled by a human owner and fed to a pet one at a time; such treats help promote good relations between an animal and its owner. By contrast, most non-canned bulk pet food is made in relatively small chunks that are designed instead to be poured into a pet food bowl; such chunks, usually made mainly from plant material by a pelleting or extruding process, are usually called "kibbles" in industry terminology.

The biscuit-type treat, created as described above, was highly attractive to both dogs and cats. Just as importantly, it did not have any odor that was objectionable to humans.

After samples of those treats were provided in confidence to Applied Food Biotechnology, Inc. (AFB), a company which manufactures flavorings for pelleted or extruded (kibble) pet foods, additional research at AFB led to the creation of methods for using the algal waste product not just on biscuit-type treats, but as flavor-enhancing additives that can be coated onto the surfaces of kibble-type pet foods.

Accordingly, one object of this invention is to disclose a method of making a healthy and nutritious food for companion animals (dogs, cats, etc.), using biomass from marine algae or fungi that are used to manufacture essential fatty acids.

Another object of this invention is to disclose a useful and profitable method of handling what has previously been a noxious waste product, generated by manufacturing operations that use algae or fungus to synthesize nutritional fatty acids.

Another object of this invention is to disclose a method of converting a noxious waste byproduct from manufacturing operations that use algae to manufacture DHA, into a useful supply of DHA which can be incorporated into pet foods that do not have the foul odor of the noxious algal waste.

Another object of this invention is to disclose a useful method of using not just one, but two different waste products: foul-smelling biomass from marine algae that are used to manufacture fatty acids, and "off-spec" (i.e., burnt) residues that collect on the interior surfaces of the cooking/drying vessels used to create spray-dried yeast extracts.

Still another object of this invention is to disclose a method of using an algal biomass waste product in a flavor-enhancing additive that can be coated onto the surfaces of pelleted or extruded kibbles, for dogs, cats, or other pet-type animals.

These and other objects of the invention will become more apparent through the following summary, description of the preferred embodiments, and claims.

SUMMARY OF THE INVENTION

Methods are disclosed for using a waste product which remains when various types of algae (such as *Crypthecodinium cohnii*) or fungi (such as *Mortierella alpina*) are used to manufacture essential fatty acids. This waste product is a biomass which includes the cell carcasses that remain after one or more essential fatty acids (such as docosahexaenoic acid, DHA) have been extracted from lysed (ruptured) cells. In one preferred embodiment which forms a biscuit-type treat for dogs or cats, algal biomass is mixed with a combination of brewer's yeast, a grain product such as whole wheat, and burnt residues that collect on the interior walls of drying vessels used for spray-drying of yeast extracts. These ingredients are mixed with water to form a dough-like substance, which is made into a desired shape for a dog, cat, or other pet treat. The dough is then cooked to form a pleasant-smelling biscuit-type treat which dogs and cats find highly appealing. In another embodiment, algal biomass is incorporated into "flavor or palatability enhancer" (FPE) additives that are coated onto the surfaces of pelleted or extruded chunks (kibbles), to prepare a flavored dog or cat food. Using algal or fungal biomass in this manner eliminates a noxious and foul-smelling waste problem for manufacturers of nutrition supplements. In addition, pet foods created in this manner contain significant quantities of DHA, a nutrient that is highly valuable in foods for dogs and cats.

DESCRIPTION OF THE PREFERRED EMBODIMENTS

This invention discloses methods for using what has formerly been a noxious and foul-smelling waste product that is generated when certain types of marine algae (such as *Crypthecodinium cohnii*) or fungi (such as *Mortierella alpina*) are used to manufacture fatty acids. The waste product is the biomass that remains behind after the fatty acids have been extracted from killed and ruptured algal or fungal cells.

The samples of algal biomass that were used in the manner described herein were obtained from Martech Biosciences, Inc. (Columbia, Md.), a company that manufactures and sells fatty acids as nutritional supplements for human use. Currently, that company must pay to have its algal waste products disposed of in sanitary landfills, by incineration, or by similar means designed to handle a solid waste disposal problem.

Several approaches were tried and tested in an effort to find a way to use the algal waste product in animal foods, but those efforts did not succeed until one of the inventors herein (Criggall) happened to be confronted with several broken bags of brewer's yeast. The bags had ruptured during shipment of the yeast, and the yeast could no longer be used for its intended purpose.

After considering the situation, Criggall decided to try to find a way to combine the brewer's yeast with the algal biomass. He decided to focus initially on dog biscuits, since they can be created and tested using dough preparations that can be cooked by a simple microwaving or baking procedure, without requiring the type of large machinery used to manufacture pelleted or extruded kibbles. Accordingly, he added whole wheat to the algal biomass and brewer's yeast, in proportions that generated a kneadable dough when water was also added.

After testing those products and evaluating the results, he decided to add a fourth ingredient, to try to improve the still-unsatisfactory aroma of the test products he was generating. The fourth ingredient was "off-spec" residue that is generated on the interior walls of the cooking/drying chambers used during the manufacturing of yeast extract. Yeast extract is normally used as a flavor and aroma enhancer in foods meant for humans, such as soups, and is typically sold for about $2/pound. The burned "off-spec" residue that collects on the interior walls of those heated vessels must be scraped, chipped, or chiseled from the interior walls, and comes off in hard chunks that can't be used for conventional purposes; accordingly, it is available at prices which are typically less than a tenth of the price for normal quality product. Accordingly, chunks of that burned material were grinded into particles, which were added to several batches of dough containing the brewer's yeast and algal biomass described above.

After the resulting dough was shaped into and microwaved for 10 minutes at 50% power in a conventional kitchen-type microwave oven, the cooked biscuits that resulted had a toasted and somewhat "meaty" aroma that was surprisingly pleasant for humans, and highly appealing to dogs and cats. Similarly, good results also were obtained in other tests where the dough was baked in a standard over at 350° F. for 35 minutes.

Subsequently, Criggall disclosed his discovery and test products to Applied Food Biotechnology, Inc. (AFB), the assignee and applicant herein. AFB does not manufacture pet foods; instead, it manufactures liquid and powdered additives that are added to non-canned pet foods which are manufactured as pelleted or extruded "kibbles". The additives sold by AFB are referred to herein as "flavor and palatability enhancer" (FPE) additives.

After studying and evaluating the baked biscuit-type "treats" that had been submitted to it by Criggall, AFB began evaluating various formulations containing the algal biomass as a potential ingredient in FPE additives for kibble-type dog and cat foods.

The results of those research efforts revealed that, when limited to appropriate concentrations and when mixed with other selected ingredients to generate a suitable complete formulation, an algal biomass that contains DHA can be incorporated as one ingredient in a complete FPE mixture which can be coated onto kibble-type pet foods. These mixtures are appealing to dogs and cats, and yet they also have mild and acceptable aromas that are not noxious or offensive to people who own dogs or cats. Several such formulations, and their method of manufacture, are described below.

It is believed that, in order to convert algal biomass into a satisfactory palatability enhancer that does not have a noxious odor, it is probably necessary, at least in most cases, to subject the algal biomass to at least one cooking or other heating step. For cooked pet treats, the heating/cooking step can be applied to a kneadable dough, at that stage of preparation; the best results were obtained when the dough was heating to a temperature of at least 160° F. during the heating process.

For flavoring coatings for kibble-type foods, the heating requirement is more flexible, and in many cases probably can be satisfied by a heated spray-drying process which is used to effectively stabilize the algae or algal biomass and reduce the water content in a manner that will prevent and retard microbial spoilage of the biomass. It also should be recognized that various methods for applying a flavor-enhancing coating to kibble-type particulate chunks involve a heating step. That heating step can also help to control and avoid odor problems.

More than 40 comparative tests have been carried out to date, using both dry and liquid formulations coated onto kibble-type particulates, in tests involving dogs as well as cats. The results of several selected tests, provided in Examples 2–5, below, are exemplary. All tests performed to date indicate that, for both dogs and cats, and for both liquid and dry FPE mixtures, algal biomass can replace meat-based ingredients which are much more expensive, and can perform either on a "parity" basis (i.e., with no substantial loss of appeal to dogs or cats), or with clearly superior results (i.e., dogs and cats clearly prefer the algal biomass FPE mixtures to the FPE mixtures containing meat products).

EXAMPLES

Example 1

Biscuit-Type Dog Treats

A number of unsuccessful attempts were made by one of the inventors herein (Criggall) to incorporate algal biomass (obtained from Martech Biosciences, Inc., Columbia, Md.) into various types of dog treats. All of these efforts resulted in products with unpleasant aromas, so these efforts were discontinued, and the algal biomass was consigned to storage in a freezer.

Subsequently, Criggall received an order of brewer's yeast with several broken bags. The exposed yeast in the broken bags could not be used for its intended purpose, so Criggall decided to test mixtures of the algal biomass with samples of the unusable yeast, to determine whether they might somehow work together successfully.

Those initial efforts also were not successful; however, it was subsequently decided that if "off-spec" (burned) yeast extract residues (available at low cost, and generated by periodically scraped the residue from the interior walls of drying chambers used to create dried yeast extract) were also included, they might impart other aromas to the final product, to either dilute and/or mask the unpleasant aroma of the algal biomass.

The initial results were somewhat more promising, yet still unsuccessful, so it was decided to add still other ingredients to the mixture.

After a number of unsuccessful tests, a kneadable dough was eventually prepared by mixing the following ingredients together at the indicated weight percentages: brewers yeast, 40%; burned yeast extract residues, 2%; food-grade whole wheat, 8%; and, algal biomass, 50%.

Sufficient water was added to the dry ingredients to create a kneadable dough. The dough was rolled into a flat layer, and cookie-shaped segments were cut from it. These segments of shaped dough were microwaved for 10 minutes at 50% power, in a conventional home-type microwave oven.

The aroma that was emitted during microwaving was relatively strong and foul. However, after cooking had been completed and the biscuits had cooled off, the foul aroma dissipated, and was replaced by a relatively pleasant aroma that combined elements of "toasted" and "meaty". The biscuits were offered to dogs, and the dogs ate them avidly.

Samples of these pleasant-smelling dog treats were provided by Criggall to AFB, along with information that they contained an algal biomass containing DHA, and that dogs ate them avidly.

Example 2

Replacement of Fish Hydrolyzate in Dog FPE Liquid

After considering the biscuit samples provided to AFB by Criggall, researchers at AFB decided to test samples of the algal biomass in FPE additives for extruded dog foods.

One such test was carried out to determine whether the algal biomass might be able to replace an expensive ingredient known as "fish hydrolyzate". This component, used in some of AFB's liquid FPE mixtures for dog foods, is generated by controlled microbial fermentation of fish parts. These microbes actively hydrolyze proteins in the fish parts that are used as initial ingredients.

In this test, a liquid FPE formulation was prepared in which the fish hydrolyzate component of a commercially-available preparation which contains both fish hydrolyzate and liver hydrolyzate (sold by AFB under the product name "Super Premium LDPE-TC") was replaced by algal biomass on a 1:1 weight ratio. The resulting liquid mixture was coated onto dry kibbles at a 2% (by weight) concentration. It was tested against another premium liquid FPE mixture for dogs, also applied to dry kibbles at 2% by weight. In a palatability preference test using 20 dogs over 2 days, the FPE mixture containing algal biomass was strongly preferred by the dogs. The consumption ratio was 2:1 in favor of the food containing the algal biomass, compared to the normal premium liquid FPE mixture. This consumption ratio is roughly the same as shown by the "Super Premium LDPE-TC" FPE mixture (with fish hydrolyzate) over the same premium liquid FPE mixture.

This result indicates that the algal biomass (which is relatively inexpensive) can replace the expensive fish hydrolyzate, with essentially no loss of appeal to dogs, in a liquid FPE formulation.

Example 3

Replacement of Fish Hydrolyzate in Dog FPE Powder

In another test, the same relatively expensive fish hydrolyzate (present at 2.5% by weight) was replaced by 10% algal biomass in a dry FPE mixture, for dogs. To accommodate for the increased weight of the biomass additive, the content of soy flour (used as a filler) was reduced from its standard level of 77.5%, to 67.5%. The algal biomass mix was tested against the fish hydrolyzate mix, in a palatability preference test using 20 dogs over 2 days. Both dry formulations were applied to kibbles at 1% of total food weight.

The mixture containing algal biomass was preferred by the dogs, with a consumption ratio of 1.7. This indicates that the algal biomass can replace the expensive fish hydrolyzate, with no loss of appeal to dogs, in a dry FPE formulation.

Example 4

Replacement of Fish Hydrolyzate in Cat FPE Powder

In another test, the expensive fish hydrolyzate (present at 20% by weight) in a premium dry FPE mixture for cats was replaced by 20% algal biomass. No other ingredients were changed. The two formulation were tested in a palatability preference test using 20 cats over 2 days. Both dry formulations were applied to kibbles at 1% of total food weight.

The consumption ratio was close to parity, with a slight preference (1.1:1) for the mixture containing fish hydrolyzate. This indicates that algal biomass can compete effectively even against a 20% concentration of expensive fish hydrolyzate, with no substantial loss of appeal to cats, in a dry FPE formulation.

Example 5

Replacement of Meat in Cat FPE Powder

In another test, a premium dry FPE mixture for cats which contains 25% poultry liver hydrolysate and 10% lactose was tested against a dry mixture containing 34% algal biomass, but no meat product or sugar. The mix containing the algal biomass was preferred, with a consumption ratio of 1.3. This indicates that the algal biomass can replace even a high concentration of a meat product in a dry FPE formulation for cats.

Thus, there has been shown and described a new and useful means for incorporating algal or fungal waste products containing essential fatty acids, into pet foods, in a way which appeals to pets and which does not create odors that are noxious and offensive to humans. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention.

What is claimed is:

1. A food preparation for companion animals, comprising a microbial biomass which contains at least one essential fatty acid useful in animal nutrition, wherein:
   a. the microbial biomass is generated as a byproduct of a manufacturing process which uses microbial cells selected from the group consisting of algae and non-yeast fungi to synthesize at least one essential fatty acid, wherein the microbial biomass contains cellular solids which remain after the microbial cells have been treated by an extraction process to remove at least one essential fatty acid;
   b. the microbial biomass contains a residual quantity of at least one essential fatty acid which was not removed during the extraction process; and,
   c. the microbial biomass is mixed with ingredients to generate an animal food preparation having a mild aroma that is acceptable to human owners of companion animals.

2. The food preparation of claim 1, wherein the microbial biomass is mixed with ingredients that form a kneadable dough which is shaped into suitable form and cooked to generate pet treats having a size and shape that are suited for individual handling by a pet owner.

3. The food preparation of claim 1, wherein the microbial biomass is mixed with ingredients which include yeast extract and burnt residues that have been removed from interior walls of cooking vessels used to prepare yeast extract.

4. The food preparation of claim 1, wherein the microbial biomass is also mixed with at least one type of grain flour and with water to form the kneadable dough.

5. The food preparation of claim 1, wherein the microbial biomass is mixed with ingredients that form a palatability-enhancing mixture which is intended to be coated onto surfaces of pet foods which are formed using an extrusion or pelleting process.

6. A food preparation for companion animals, comprising cooked biscuit treats having a size and shape that are suited for individual handling by a pet owner, wherein the biscuit treats contain a microbial biomass which provides at least one essential fatty acid useful in animal nutrition, wherein:
   a. the microbial biomass is generated as a byproduct of a manufacturing process which uses microbial cells, selected from the group consisting of algae and non-yeast fungi, to synthesize at least one essential fatty acid, wherein the microbial biomass contains microbial cellular solids which remain after the microbial cells have been treated by an extraction process to remove at least one essential fatty acid; and, b. the microbial biomass contains a residual quantity of at least one essential fatty acid which was not removed during the solvent extraction process; and, c. the microbial biomass has been mixed with biscuit ingredients and subjected to a controlled heating process which generates cooked biscuit treats having a mild aroma that is acceptable to human owners of companion animals.

7. The food preparation of claim 6, wherein the microbial biomass is mixed with ingredients which include yeast extract and burnt residues that have been removed from interior walls of cooking vessels used to prepare yeast extract.

8. The food preparation of claim 7, wherein the microbial biomass is also mixed with at least one type of grain flour and with water.

9. A palatability-enhancing additive for use on non-canned foods for companion animals, comprising a microbial biomass which contains at least one essential fatty acid useful in animal nutrition, wherein:

a. the microbial biomass is generated as a byproduct of a manufacturing process which uses microbial cells selected from the group consisting of algae and non-yeast fungi to synthesize at least one essential fatty acid, wherein the microbial biomass contains microbial cellular solids which remain after the microbial cells have been treated by an extraction process to remove at least one essential fatty acid; and, b. the microbial biomass contains a residual quantity of at least one essential fatty acid which is useful in animal nutrition and which was not removed from the microbial biomass during the extraction process.

10. The palatability-enhancing additive of claim 9, wherein the palatability-enhancing additive is a liquid mixture which is designed to be coated onto surfaces of particulate food chunks formed by an extrusion or pelleting process, wherein the palatability-enhancing additive can be coated onto the surfaces of the food chunks at a suitable concentration and in a suitable manner to generate a palatability-enhanced food product that has a mild aroma which is acceptable to human owners of companion animals.

11. The palatability-enhancing additive of claim 9, wherein the palatability-enhancing additive is a dry mixture which is designed to be coated onto surfaces of particulate food chunks formed by an extrusion or pelleting process, wherein the palatability-enhancing additive can be coated onto the surfaces of the food chunks at a suitable concentration and in a suitable manner to generate a palatability-enhanced food product that has a mild aroma which is acceptable to human owners of companion animals.

12. A method for enhancing palatability of a food preparation for companion animals, comprising the step of incorporating into the food preparation a suitable concentration of a microbial biomass which contains at least one essential fatty acid useful in animal nutrition, wherein:

a. the microbial biomass is generated as a byproduct of a manufacturing process which uses a microbe selected from the group consisting of algae and non-yeast fungi to synthesize at least one essential fatty acid, wherein the microbial biomass contains microbial cellular solids which remain after the microbes have been treated by an extraction process to remove at least one essential fatty acid;

b. the microbial biomass contains a residual quantity of at least one essential fatty acid which was not removed during the extraction process; and, c. the microbial biomass is mixed with ingredients to generate an animal food preparation having a mild aroma that is acceptable to human owners of companion animals.

13. The method of claim 12, wherein the microbial biomass is mixed with ingredients that form a kneadable dough which is shaped into suitable form and cooked to generate pet treats having a size and shape that are suited for individual handling by a pet owner.

14. The method of claim 13, wherein the microbial biomass is mixed with ingredients which include yeast extract and burnt residues that have been removed from interior walls of cooking vessels used to prepare yeast extract.

15. The method of claim 14, wherein the microbial biomass is also mixed with at least one type of grain flour and with water to form the kneadable dough.

16. The method of claim 12, wherein the microbial biomass is mixed with ingredients that form a palatability-enhancing mixture which is intended to be coated onto surfaces of pet foods which are formed using an extrusion or pelleting process.

* * * * *